United States Patent
Zhu et al.

(10) Patent No.: US 12,270,645 B2
(45) Date of Patent: Apr. 8, 2025

(54) HIGH-RESOLUTION PHASE DETECTION METHOD AND SYSTEM BASED ON PLANE GRATING LASER INTERFEROMETER

(71) Applicant: TSINGHUA UNIVERSITY, Beijing (CN)

(72) Inventors: Yu Zhu, Beijing (CN); Jinchun Hu, Beijing (CN); Rujin Han, Beijing (CN); Chang Tian, Beijing (CN); Ming Zhang, Beijing (CN); Wensheng Yin, Beijing (CN); Rong Cheng, Beijing (CN); Dengfeng Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 516 days.

(21) Appl. No.: 17/601,179

(22) PCT Filed: Apr. 2, 2020

(86) PCT No.: PCT/CN2020/082866
§ 371 (c)(1),
(2) Date: Oct. 4, 2021

(87) PCT Pub. No.: WO2020/200257
PCT Pub. Date: Oct. 8, 2020

(65) Prior Publication Data
US 2022/0196383 A1 Jun. 23, 2022

(30) Foreign Application Priority Data
Apr. 4, 2019 (CN) .............................. 201910270026

(51) Int. Cl.
*G01B 9/02015* (2022.01)
*G01B 11/02* (2006.01)

(52) U.S. Cl.
CPC .......... *G01B 9/02027* (2013.01); *G01B 11/02* (2013.01)

(58) Field of Classification Search
None
See application file for complete search history.

(56) References Cited

U.S. PATENT DOCUMENTS 7,764,383 B1 * 7/2010 Holeva .................. G01J 3/45
356/451

FOREIGN PATENT DOCUMENTS

| CN | 1069569 A | 3/1993 |
| CN | 1737494 A | 2/2006 |

(Continued)

OTHER PUBLICATIONS

Lu, Sen et al., "Real Time Correction of Periodic Nonlinearity in Homodyne Detection for Scanning Beam Interference Lithography," Optical Engineering 57(10), 104107 (Oct. 2018).

(Continued)

*Primary Examiner* — Matthew G Marini
(74) *Attorney, Agent, or Firm* — HOLZER PATEL DRENNAN

(57) ABSTRACT

A high-resolution phase detection method and system based on a plane grating laser interferometer. The method uses a dual-frequency interferometer to measure the displacement, and the measurement signal processing comprises an integral part and a decimal portion, a phase equation set of a displacement measurement signal is constructed according to a measurement optical path principle of a heterodyne plane grating laser interferometer; a non-linear equation set for which the unknowns are instantaneous phase, interval phase and signal amplitude is established; and the equation sets above are solved by using the least squares method, so as to realize phase discrimination, thereby realizing precise (Continued)

displacement measurement. The method can solve the problems in the traditional time measurement-based phase detection technology, such as low measurement accuracy, and failing to satisfy small measuring range measurement. The measurement method can be applied to systems such as precision manufacturing equipment and lithography machine.

6 Claims, 3 Drawing Sheets

(56) References Cited

FOREIGN PATENT DOCUMENTS

| | | | |
|---|---|---|---|
| CN | 101165458 A | 4/2008 | |
| CN | 103063128 A | 4/2013 | |
| CN | 107860318 A | 3/2018 | |
| CN | 107907047 A | 4/2018 | |
| CN | 108106536 A | 6/2018 | |
| CN | 109990713 A | 7/2019 | |
| EP | 2693164 A1 * | 2/2014 | ......... G01B 11/0675 |
| JP | H06201316 A | 3/2018 | |

OTHER PUBLICATIONS

Wang, Lei-jie et al., "A Displacement Measurement System for Ultra-Precision Heterodyne Littrow Grating Interferometer", Optics and Precision Engineering, vol. 25, No. 12, Dec. 2017.
Search Report for International Application PCT/CN2020/082866, completed Jun. 17, 2020.

* cited by examiner

HIGH-RESOLUTION PHASE DETECTION METHOD AND SYSTEM BASED ON PLANE GRATING LASER INTERFEROMETER

This application claims the priority of the Chinese Patent Application No. 201910270026.0 filed on Apr. 4, 2019, and entitled "high-resolution phase detection method based on plane grating laser interferometer."

TECHNICAL FIELD

The present disclosure relates to a high-resolution phase detection method and system based on a plane grating laser interferometer, and particularly, to a high-resolution phase detection method and system based on a dual-frequency plane grating laser interferometer, which belongs to the technical field of the precision displacement measurement.

BACKGROUND ART

The precision manufacturing industry plays an important role in the economic development of a region or a country, and is one of the main symbols for measuring the development of a country's manufacturing technology. Precision displacement measurement technology is one of the most key technologies in the precision manufacturing industry. Precision displacement measurement technology is the basis of manufacturing precision instruments, which determines the manufacturing accuracy of the whole manufacturing industry. At present, most precision displacement measurement systems use advanced optical displacement measurement technologies such as grating measurement systems or laser interferometers. Laser interferometer measurement technology has the characteristics of high precision, high resolution and high stability; in addition, its non-contact measurement method can avoid surface damage to the measured parts, so as to reduce the additional error and application limitations. Phase detection is of great significance in signal transformation, information acquisition, control, etc. Sine signal is widely used in radar, sonar and communication. The traditional phase detection technology based on time measurement has low measurement accuracy and cannot meet the requirements of the displacement measurement with a small measuring range and high precision. Therefore, a high-resolution phase detection method based on plane grating laser interference is needed to be proposed.

SUMMARY

As described above, a high-resolution phase detection method and system based on a plane grating laser interferometer are proposed, and the method and system use the phase detection method based on a dual-frequency interferometer to realize displacement measurement, so as to solve the problems of low measurement accuracy and inability to meet the measurement requirements with small measuring range in the traditional phase detection technology based on time measurement.

According to one aspect of the present disclosure, there is provided a high-resolution phase detection method based on a plane grating laser interferometer, comprising:

in a dual-frequency plane grating laser interferometer, outputting a standard sine signal as a reference signal by using a first interferometer, and outputting a sine-like signal as a displacement measurement signal by using a second interferometer, wherein each of phase changes of the sine-like signal and the standard sine signal includes an integer portion and a decimal portion, and the integer portion of a phase change is represented by $N \cdot 2\pi$, and wherein N is the number of integer period of the phase change;

solving the decimal portion of each phase change: establishing a measured signal function as $y(t)=A\sin(\omega t)+\varepsilon$, wherein the displacement measurement signal and the reference signal are measured signals, t is the sampling time, $y(t)$ is the sampling value of the measured signal at time t, A is the amplitude of the signal, $\omega$ is the angular frequency of the signal, and $\varepsilon$ is the noise of the signal;

sampling the measured signal during a predetermined period before a measurement time, dividing the predetermined period into a plurality of sampling points with a predetermined sampling time interval, and obtaining a measured signal equation of each of the sampling points by using the measured signal function;

solving the measured signal equation set of the plurality of sampling points as a general nonlinear equation set; and adding the integer portion and the solution of the decimal portion to obtain a whole phase value, and the high-resolution phase detection based on the plane grating laser interferometer is completed.

In the high-resolution phase detection method based on the plane grating laser interferometer, the step of obtaining the measured signal equation of each of the sampling points by using the measured signal function comprises:

sampling the measured signal at a predetermined sampling time interval before time $t_c$, and recording m+1 sampling points, wherein m≥3; and obtaining the displacement measurement signal, which is $y(t_{c,-n})=A\sin(\omega t_{c,-n})+\varepsilon_{c,-n}$, of m sampling points before time $t_c$ by using the measured signal function, wherein the sampling time is represented by $t_{c,0}, t_{c,-1}, \ldots, t_{c,-(n-1)}, t_{c,-(n-2)}, \ldots, t_{c,-(m-1)}, t_{c,-m}$, n=0, 1, 2, ..., m, and $\varepsilon_{c,-n}$ is the noise of the signal at time $t_{c,-n}$;

converting the displacement measurement signal $y(t_{c,-n})$ to $y(t_{c,-n})=A\sin(\omega t_c - n\omega T_g)+\varepsilon_{c,-n}$, wherein the predetermined sampling time interval is represented by $T_g = t_{c,0} - t_{c,-1} = \ldots = t_{c,-(n-1)} - t_{c,-(n-2)} = \ldots = t_{c,-(m-1)} - t_{c,-m}$, let the phase at time $t_c$ be $\varphi_c = \omega t_c$, and let $\varphi_g = \omega T_g$, and then:

$$y(t_{c,-n}) = A\sin(\varphi_c - n\varphi_g) + \varepsilon_{c,-n},$$

wherein $\varphi_g$ is the phase change during the predetermined sampling time interval $T_g$, which is referred to as an interval phase, and $\varphi_g$ is in a range of 0-360°;

establishing m+1 measured signal equations and obtaining the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-m}) = A\sin(\varphi_c - m\varphi_g) + \varepsilon_{c,-m} \end{cases}$$

In the high-resolution phase detection method based on the plane grating laser interferometer, the step of solving the measured signal equation set of the plurality of sampling points as a general nonlinear equation set comprises:

solving the measured signal equation set of the plurality of sampling points as a general nonlinear equation set $Y=f(X)+\varepsilon$, wherein Y is the sampling value $y(t_{c,-n})$ of the measured signal, $X=[\varphi_c\ \varphi_g\ A]$ is the unknown to be solved; the initial value and the genuine solution value of the general nonlinear equation set are represented by $X_0$ and $X^*$ respectively, and $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0}(X - X_0) + o(X - X_0) + \varepsilon$$

wherein $o(X-X_0)$ is an infinitesimal compared with $(X-X_0)$; and the initial value $X_0$ is close enough to $X^*$, a solution fast approaching the genuine solution value $X^*$ is obtained by using least squares method.

In the high-resolution phase detection method based on the plane grating laser interferometer, the step of solving the measured signal equation set of the plurality of sampling points as a general nonlinear equation set further comprises: minimizing $[o(X-X_0)+\varepsilon]^T[o(X-X_0)+\varepsilon]$ by using least squares method to obtain an approximate solution $X_1$ of X, and then:

$$X_1 = X_0 + \left[\left(\frac{\partial F}{\partial X}\bigg|_{X=X_0}\right)^T\left(\frac{\partial F}{\partial X}\bigg|_{X=X_0}\right)\right]^{-1}\left(\frac{\partial F}{\partial X}\bigg|_{X=X_0}\right)^T[Y - F(X_0)]$$

in the case of $|X^*-X_1|\leq|X^*-X_0|$, obtaining the solution sequence $X_p$ by using least squares method continuously:

$$X_{p+1} = X_p + \left[\left(\frac{\partial F}{\partial X}\bigg|_{X=X_0}\right)^T\left(\frac{\partial F}{\partial X}\bigg|_{X=X_0}\right)\right]^{-1}\left(\frac{\partial F}{\partial X}\bigg|_{X=X_0}\right)^T[Y - F(X_p)]$$

if $|X^*-X_{p+1}|\leq|X^*-X_p|$, returning to the previous step, otherwise, ending loop and thus obtaining $X_p$ fast approaching the genuine solution value $X^*$.

According to another aspect of the present disclosure, there is provided a high-resolution phase detection method based on a plane grating laser interferometer, and the method comprises the following steps:

step 1: in a dual-frequency plane grating laser interferometer, outputting a standard sine signal as a reference signal by using a first interferometer, and outputting a sine-like signal as a displacement measurement signal by using a second interferometer, wherein each of phase changes of the sine-like signal and the standard sine signal includes an integer portion and a decimal portion, and the integer portion of a phase change is represented by $N\cdot 2\pi$, and wherein N is the number of integer period of the phase change;

step 2: solving the decimal portion of each phase change: establishing a measured signal function as $y(t)=A\sin(\omega t)+\varepsilon$, wherein the displacement measurement signal and the reference signal are measured signals, t is the sampling time, $y(t)$ is the sampling value of the measured signal at time t, A is the amplitude of the signal, $\omega$ is the angular frequency of the signal, and $\varepsilon$ is the noise of the signal;

step 3: sampling the measured signal at a predetermined sampling time interval before time $t_v$, and recording m+1 sampling points, wherein $m\geq 3$; and obtaining the displacement measurement signal, which is $y(t_{c,-n})=A\sin(\omega t_{c,-n})+\varepsilon_{c,-n}$, of m sampling points before time $t_c$ by using the function in step 2, wherein the sampling time is represented by $t_{c,0}$, $t_{c,-1}$, ..., $t_{c,-(n-1)}$, $t_{c,-(n-2)}$, ..., $t_{c,-(m-1)}$, $t_{c,-m}$, n=0, 1, 2, ..., m, and $\varepsilon_{c,-n}$ is the noise of the signal at time $t_{c,-n}$;

step 4: converting $y(t_{c,-n})$ in step 3 to $y(t_{c,-n})=A\sin(\omega t_c - n\omega T_g)+\varepsilon_{c,-n}$, wherein the predetermined sampling time interval is represented by $T_g=t_{c,0}-t_{c,-1}=\ldots=t_{c,-(n-1)}-t_{c,-(n-2)}=\ldots=t_{c,-(m-1)}-t_{c,-m}$, let the phase at time $t_c$ be $\varphi_c=\omega t_c$, and let $\varphi_g=\omega T_g$, and then:

$$y(t_{c,-n})=A\sin(\varphi_c-n\varphi_g)+\varepsilon_{c,-n},$$

wherein $\varphi_g$ is the phase change during the predetermined sampling time interval $T_g$, and is referred to as an interval phase, and $\varphi_g$ is in a range of 0-360°;

step 5: repeating step 4 to establish m+1 measured signal equations, and obtaining the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-m}) = A\sin(\varphi_c - m\varphi_g) + \varepsilon_{c,-m} \end{cases}.$$

step 6: solving the above equation set as a general nonlinear equation set $Y=f(X)+\varepsilon$, wherein Y is the sampling value $y(t_{c,-n})$ of the measured signal, $X=[\varphi_c\ \varphi_g\ A]$ is the unknown to be solved; the initial value and the genuine solution value of the general nonlinear equation set are represented by $X_0$ and $X^*$ respectively, and $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0}(X - X_0) + o(X - X_0) + \varepsilon$$

wherein $o(X-X_0)$ is an infinitesimal compared with $(X-X_0)$; and the initial value $X_0$ is close enough to $X^*$, a solution fast approaching the genuine solution value $X^*$ is obtained by using least squares method;

step 7: adding the integer portion and a solution of the decimal portion to obtain a whole phase value, and the high-resolution phase detection based on the plane grating laser interferometer is completed.

In the high-resolution phase detection method based on the plane grating laser interferometer, the step of solving the general nonlinear equation set in the method comprises the following specific steps:

step 1: minimizing $[o(X-X_0)+\varepsilon]^T[o(X-X_0)+\varepsilon]$ by using least squares method to obtain an approximate solution $X_1$ of X, and then:

$$X_1 = X_0 + \left[\left(\frac{\partial F}{\partial X}\bigg|_{X=X_0}\right)^T\left(\frac{\partial F}{\partial X}\bigg|_{X=X_0}\right)\right]^{-1}\left(\frac{\partial F}{\partial X}\bigg|_{X=X_0}\right)^T[Y - F(X_0)]$$

step 2: in the case of $|X^*-X_1|\leq|X^*-X_0|$, obtaining the solution sequence $X_p$ by using least squares method continuously:

$$X_{p+1} = X_p + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_p)]$$

step 3: if $|X^* - X_{p+1}| \leq |X^* - X_p|$, returning to step 2, otherwise, ending loop and thus obtaining $X_p$ fast approaching the genuine solution value $X^*$.

According to a third aspect of the present disclosure, there is provided a high-resolution phase detection system based on a plane grating laser interferometer, comprising:

a measured signal generating module, which outputs a standard sine signal as a reference signal by using a first interferometer, and outputs a sine-like signal as a displacement measurement signal by using a second interferometer in a dual-frequency plane grating laser interferometer, wherein the displacement measurement signal and the reference signal are measured signals, each of phase changes of the sine-like signal and the standard sine signal includes an integer portion and a decimal portion, and the integer portion of a phase change is represented by $N \cdot 2\pi$, and wherein N is the number of integer period of the phase change;

a measured signal function constructing module, which establishes a measured signal function as $y(t) = A \sin(\omega t) + \varepsilon$, wherein t is the sampling time, $y(t)$ is the sampling value of the measured signal at time t, A is the amplitude of the signal, $\omega$ is the angular frequency of the signal, and $\varepsilon$ is the noise of the signal;

a sampling module, which samples the measured signal during a predetermined period before a measurement time, divides the predetermined period into a plurality of sampling points with a predetermined sampling time interval, and obtains a measured signal equation of each of the sampling points by using the measured signal function;

a solving module, which solves a measured signal equation set of the plurality of sampling points as a general nonlinear equation set; and a phase value obtaining module, which adds the integer portion and the solution of the decimal portion to obtain a whole phase value, and the high-resolution phase detection based on the plane grating laser interferometer is completed.

In the high-resolution phase detection system based on plane grating laser interferometer, the sampling module comprises:

a sampling point obtaining unit, which samples the measured signal at a predetermined sampling time interval before time $t_c$, and records m+1 sampling points, wherein $m \geq 3$; and obtains the displacement measurement signal of m sampling points before time $t_c$ is $y(t_{c,-n}) = A \sin(\omega t_{c,-n}) + \varepsilon_{c,-n}$ by using the measured signal function, wherein the sampling time is represented by $t_{c,0}, t_{c,-1}, \ldots, t_{c,-(n-1)}, t_{c,-(n-2)}, \ldots, t_{c,-(m-1)}, t_{c,-m}$, $n = 0, 1, 2, \ldots, m$, and $\varepsilon_{c,-n}$ is the noise of the signal at time $t_{c,-n}$;

a phase converting unit, converting the displacement measurement signal $y(t_{c,-n})$ to $y(t_{c,-n}) = A \sin(\omega t_c - n\omega T_g) + \varepsilon_{c,-n}$, wherein the predetermined sampling time interval is represented by $T_g = t_{c,0} - t_{c,-1} = \ldots = t_{c,-(n-1)} - t_{c,-(n-2)} = \ldots = t_{c,-(m-1)} - t_{c,-m}$, and let the phase at time $t_c$ be $\varphi_c = \omega t_c$, and let $\varphi_g = \omega T_g$, and then:

$$y(t_{c,-n}) = A \sin(\varphi_c - n\varphi_g) + \varepsilon_{c,-n},$$

wherein $\varphi_g$ is the phase change during the predetermined sampling time interval $T_g$, and is referred to as an interval phase, and $\varphi_g$ is in a range of 0-360°; and an equation set obtaining unit, which establishes m+1 measured signal equations and obtains the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-m}) = A\sin(\varphi_c - m\varphi_g) + \varepsilon_{c,-m} \end{cases}.$$

In the high-resolution phase detection system based on plane grating laser interferometer, the solving module comprises:

a nonlinear equation set constructing unit, which solves the measured signal equation set of the plurality of sampling points as a general nonlinear equation set $Y = f(X) + \varepsilon$, wherein Y is the sampling value $y(t_{c,-n})$ of the measured signal, and $X = [\varphi_c \; \varphi_g \; A]$ is the unknown to be solved; and an equation set solving unit, obtaining the solution approaching the genuine solution value $X^*$ by using least squares method, wherein the initial value and the genuine solution value of the general nonlinear equation set are represented by $X_0$ and $X^*$ respectively, wherein $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0} (X - X_0) + o(X - X_0) + \varepsilon,$$

wherein $o(X - X_0)$ is an infinitesimal compared with $(X - X_0)$; and the initial value $X_0$ is close enough to $X^*$.

In the high-resolution phase detection system based on the plane grating laser interferometer, the dual-frequency plane grating laser interferometer comprises a laser source, a collimator, a quarter wave plate, a beam splitter, a polarizing beam splitter, a fixed platform, a movable platform, a first interferometer and a second interferometer. The laser source emits a laser beam passing through the collimator, and the laser beam is divided into two beams by the beam splitter after passing through the quarter wave plate, one beam of which outputs a first output signal after passing through the first interferometer, and the other beam continues to be divided into two beams by the polarizing beam splitter, and then the two beams interfere after being reflected by gratings mounted on the fixed platform and the movable platform respectively to output a second output signal after passing through the second interferometer.

The present disclosure has the following advantages and prominent technical effects: the present disclosure realizes a high-resolution phase detection of the sine signal, realizes the ultra-precision measurement of its decimal portion as well as the integer portion of the measured signal. The present disclosure can solve the problems of low measurement accuracy and inability to meet the measurement requirements with a small measuring range in the traditional phase detection technology based on time measurement, and has a wide application prospect.

DETAILED DESCRIPTION OF EMBODIMENTS

Hereinafter, embodiments of the present disclosure will be further described in detail in conjunction with the accompanying drawings.

Figure 1:
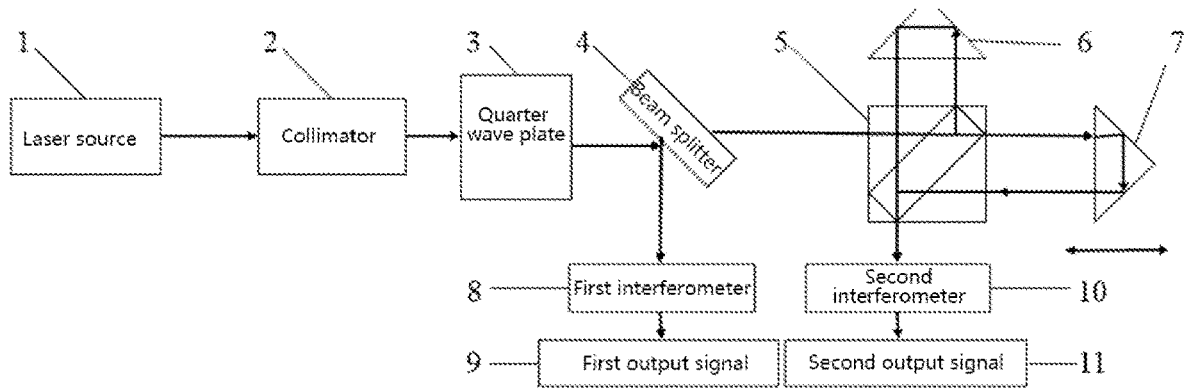
FIG. 1 is a schematic diagram of phase detection using the dual-frequency plane grating laser interferometer according to the present disclosure, wherein the dual-frequency plane grating laser interferometer includes: laser source 1, collimator 2, quarter wave plate 3, beam splitter 4, polarizing beam splitter 5, fixed platform 6, movable platform 7, first interferometer 8, first output signal 9, second interferometer 9, and second output signal 11.

In the dual-frequency plane grating laser interferometer, as shown in FIG. 1, the laser source 1 emits a laser beam passing through the collimator 2. The laser beam is divided into two beams by the beam splitter 4 after passing through the quarter wave plate 3, one beam of which outputs the first output signal 9 after passing through the first interferometer 8, and the other beam continues to be divided into two beams by the polarizing beam splitter 5. The two beams divided by the polarizing beam splitter 5 interfere after being reflected by the gratings mounted on the fixed platform 6 and the movable platform 7 respectively to output the second output signal 11 after passing through the second interferometer 10. The first interferometer outputs a standard sine signal as a reference signal, and the second interferometer outputs a sine-like signal as a measurement signal.

Figure 2:
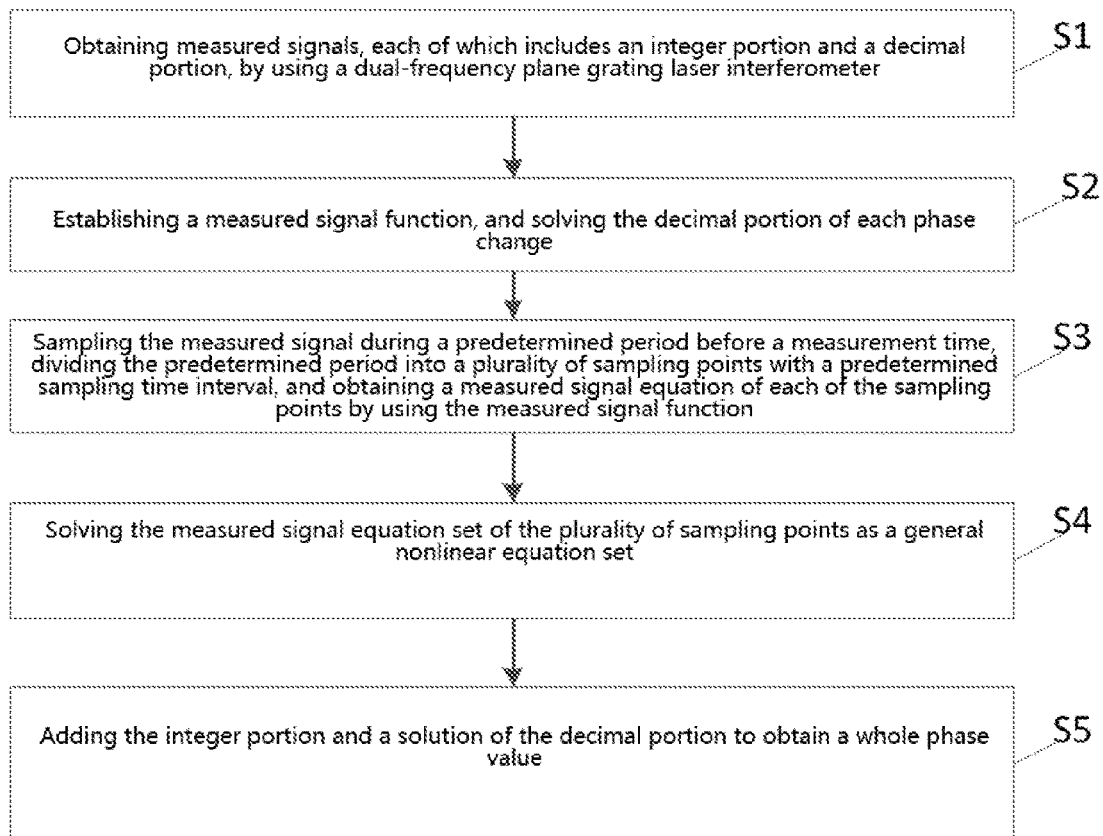
FIG. 2 is a flowchart of the high-resolution phase detection method based on the plane grating laser interferometer according to the present disclosure.

FIG. 2 is a flowchart of the high-resolution phase detection method based on the plane grating laser interferometer according to the present disclosure, as shown in FIG. 2, the high-resolution phase detection method comprises the following steps:

step S1: in a dual-frequency plane grating laser interferometer, outputting a standard sine signal as a reference signal by using a first interferometer, and outputting a sine-like signal as a displacement measurement signal by using a second interferometer, wherein each of phase changes of the sine-like signal and the standard sine signal includes an integer portion and a decimal portion, and the integer portion of a phase change is represented by $N \cdot 2\pi$, and wherein N is the number of integer period of the phase change;

step S2: solving the decimal portion of each phase change: and establishing a measured signal function as $y(t) = A \sin(\omega t) + \varepsilon$, wherein the displacement measurement signal and the reference signal are measured signals, t is the sampling time, y(t) is the sampling value of the measured signal at time t, A is the amplitude of the signal, $\omega$ is the angular frequency of the signal, and $\varepsilon$ is the noise of the signal;

step S3: sampling the measured signal during a predetermined period before a measurement time, dividing the predetermined period into a plurality of sampling points with a predetermined sampling time interval, and obtaining a measured signal equation of each of the sampling points by using the measured signal function;

step S4: solving the measured signal equation set of the plurality of sampling points as a general nonlinear equation set; and step S5: adding the integer portion and the solution of the decimal portion to obtain a whole phase value, and the high-resolution phase detection based on the plane grating laser interferometer is completed.

In one embodiment, step S3 comprises:

sampling the measured signal at a predetermined sampling time interval before time $t_c$, and recording m+1 sampling points, wherein m≥3; and obtaining the displacement measurement signal, which is $y(t_{c,-n}) = A \sin(\omega t_{c,-n}) + \varepsilon_{c,-n}$, of m sampling points before time $t_c$, by using the measured signal function in step S2, wherein the sampling time is represented by $t_{c,0}$, $t_{c,-1}$, ..., $t_{c,-(n-1)}$, $t_{c,-(n-2)}$, ..., $t_{c,-(m-1)}$, $t_{c,-m}$, n=0, 1, 2, ..., m, and $\varepsilon_{c,-n}$ is the noise of the signal at time $t_{c,-n}$;

converting the displacement measurement signal $y(t_{c,-n})$ to $y(t_{c,-n}) = A \sin(\omega t_c - n\omega T_g) + \varepsilon_{c,-n}$, wherein the predetermined sampling time interval is represented by $T_g = t_{c,0} - t_{c,-1} = \ldots = t_{c,-(n-1)} - t_{c,-(n-2)} = \ldots = t_{c,-(m-1)} - t_{c,-m}$, let the phase at time $t_c$ be $\varphi_c = \omega t_c$, and let $\varphi_g = \omega T_g$, and then:

$$y(t_{c,-n}) = A \sin(\varphi_c - n\varphi_g) + \varepsilon_{c,-n},$$

wherein $\varphi_g$ is the phase change during the predetermined sampling time interval $T_g$, which is referred to as an interval phase, and in a range of 0-360°; and establishing m+1 measured signal equations and obtaining the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-m}) = A\sin(\varphi_c - m\varphi_g) + \varepsilon_{c,-m} \end{cases}.$$

In one embodiment, step S4 comprises:

solving the measured signal equation set of the plurality of sampling points as a general nonlinear equation set $Y = f(X) + \varepsilon$, wherein Y is the sampling value $y(t_{c,-n})$ of the measured signal, $X = [\varphi_c \; \varphi_g \; A]$ is the unknown to be solved; the initial value and the genuine solution value of the general nonlinear equation set are represented by $X_0$ and $X^*$ respectively, and $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0}(X - X_0) + o(X - X_0) + \varepsilon,$$

wherein $o(X - X_0)$ is an infinitesimal compared with $(X - X_0)$; and the initial value $X_0$ is close enough to $X^*$, a solution fast approaching the genuine solution value $X^*$ is obtained by using least squares method.

Preferably, the method for solving the general nonlinear equation set in step S4 comprises:

step 1: minimizing $[o(X-X_0)+\varepsilon]^T[o(X-X_0)+\varepsilon]$ by using least squares method to obtain an approximate solution $X_1$ of $X$, and then:

$$X_1 = X_0 + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_0)];$$

step 2: in the case of $|X^*-X_1| \le |X^*-X_0|$, obtaining the solution sequence $X_p$ by using least squares method continuously:

$$X_{p+1} = X_p + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_p)];$$

step 3: if $|X^*-X_{p+1}| \le |X^*-X_p|$, returning to step 2, otherwise, ending loop and thus obtaining $X_p$ fast approaching the genuine solution value $X^*$.

Figure 3:
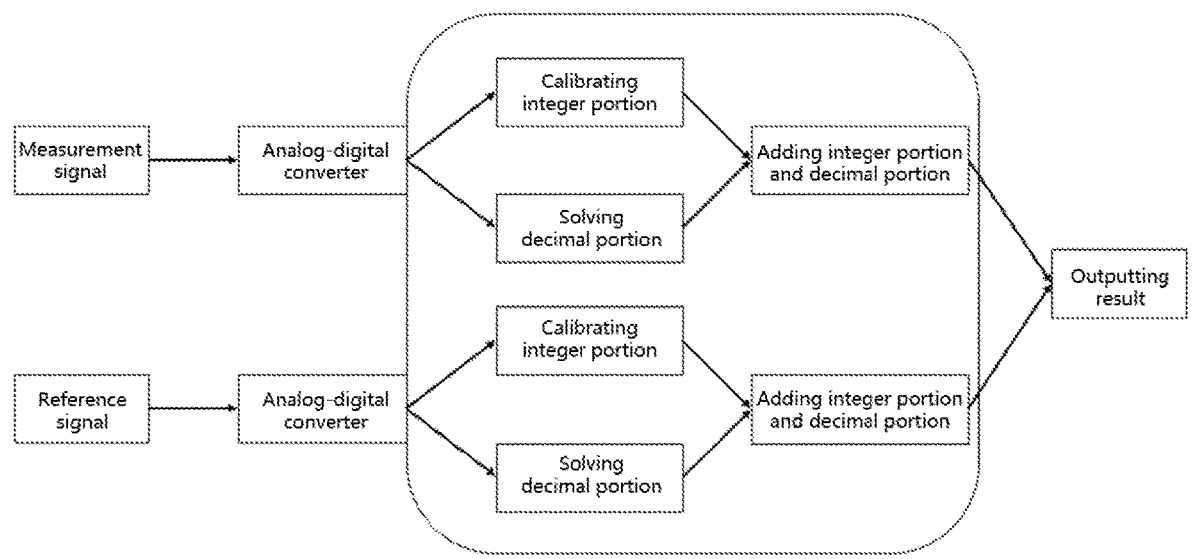
FIG. 3 is a digitizing processing flowchart of the high-resolution phase detection method based on the plane grating laser interferometer according to the present disclosure.
Figure 4:
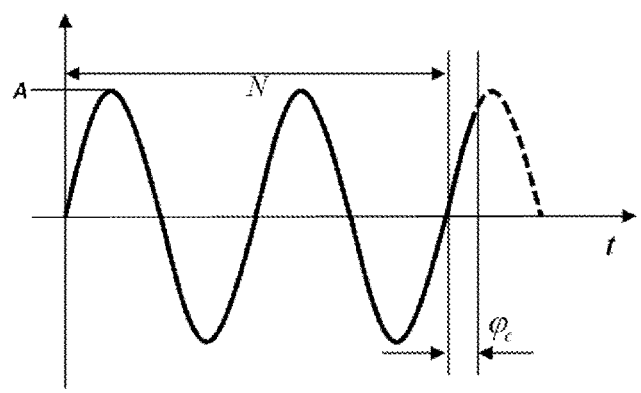
FIG. 4 is a phase change diagram according to the present disclosure, including an integer portion and a decimal portion.
Figure 5:
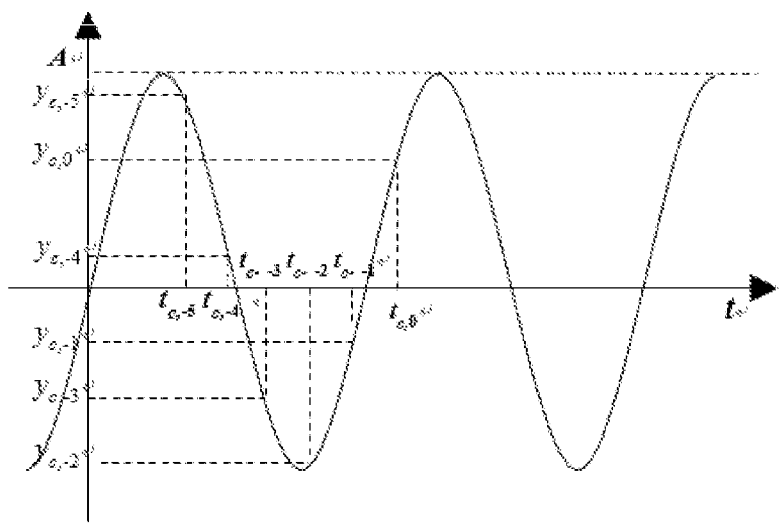
FIG. 5 is a sampling example of the displacement measurement signal at a predetermined sampling time interval before time $t_c$ according to the present disclosure.

In a preferred embodiment of the present disclosure, the high-resolution phase detection method based on the plane grating laser interferometer comprises the following steps:

step 1: in a dual-frequency plane grating laser interferometer, as shown in FIG. 1, the laser source 1 emitting a laser beam passing through the collimator 2, and the laser beam is divided into two beams by the beam splitter 4 after passing through the quarter wave plate 3; one beam outputting the first output signal 9 after passing through the first interferometer 8, and the other beam continuing to be divided into two beams by the polarizing beam splitter 5, and then the two beams interfering after being reflected by the gratings mounted on the fixed platform 6 and the movable platform 7 respectively to output the second output signal 11 after passing through the second interferometer 10, wherein the first interferometer outputs a standard sine signal as a reference signal, and the second interferometer outputs a sine-like signal as a measurement signal;

step 2: a digitizing processing flow of the high-resolution phase detection method based on the plane grating laser interferometer, as shown in FIG. 3, wherein each of the phase changes of the sine-like signal and the standard sine signal includes an integer portion and a decimal portion, as shown in FIG. 4;

step 3: calibrating a phase of the integer portion of each phase change, wherein the integer portion of a phase change is represented by $N \cdot 2\pi$, and wherein $N$ is the number of integer period of the phase change;

step 4: solving the decimal portion of each phase change: establishing a measured signal function as $y(t)=A \sin(\omega t)+\varepsilon$, wherein the displacement measurement signal and the reference signal are measured signals, $t$ is the sampling time, $y(t)$ is the sampling value of the measured signal at time $t$, $A$ is the amplitude of the signal, $\omega$ is the angular frequency of the signal, and $\varepsilon$ is the noise of the signal;

step 5: sampling the measured signal at a predetermined sampling time interval before time $t_c$, and recording $m+1$ sampling points, wherein $m \ge 3$; and obtaining the displacement measurement signal, which is $y(t_{c,-n})=A \sin(\omega t_{c,-n})+\varepsilon_{c,-n}$, of m sampling points before time $t_c$ by using the function in step 4, wherein the sampling time is represented by $t_{c,0}$, $t_{c,-1}$, ..., $t_{c,-(n-1)}$, $t_{c,-(n-2)}$, ..., $t_{c,-(m-1)}$, $t_{c,-m}$, as illustrated in FIG. 5, $n=0, 1, 2, \ldots, m$, and $\varepsilon_{c,-n}$ is the noise of the signal at time $t_{c,-n}$;

step 6: converting $y(t_{c,-n})=A \sin(\omega t_{c,-n})+\varepsilon_{c,-n}$ in step 5 to $y(t_{c,-n})=A \sin(\omega t_c - n\omega T_g)+\varepsilon_{c,-n}$, wherein the predetermined sampling time interval is represented by $T_g=t_{c,0}-t_{c,-1}=\ldots=t_{c,-(n-1)}-t_{c,-(n-2)}=\ldots=t_{c,-(m-1)}-t_{c,-m}$, let the phase at time $t_c$ be $\varphi_c=\omega t_c$, and let $\varphi_g=\omega T_g$, and then:

$$y(t_{c,-n})=A \sin(\varphi_c - n\varphi_g)+\varepsilon_{c,-n},$$

wherein $\varphi_g$ is the phase change during the predetermined sampling time interval $T_g$, and is referred to as an interval phase, and $\varphi_g$ is in a range of 0-360°;

step 7: repeating step 6 to establish $m+1$ measured signal equations, and obtaining the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-m}) = A\sin(\varphi_c - m\varphi_g) + \varepsilon_{c,-m} \end{cases}.$$

step 8: solving the above equation set as a general nonlinear equation set $Y=f(X)+\varepsilon$, wherein $Y$ is the sampling value $y(t_{c,-n})$ of the measured signal, and $X=[\varphi_c\ \varphi_g\ A]$ is the unknown to be solved; the initial value and the genuine solution value of the general nonlinear equation set are represented by $X_0$ and $X^*$ respectively, wherein $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0} (X - X_0) + o(X - X_0) + \varepsilon,$$

wherein $o(X-X_0)$ is an infinitesimal compared with $(X-X_0)$; and the initial value $X_0$ is close enough to $X^*$, a solution fast approaching the genuine solution value $X^*$ is obtained by using least squares method, and the specific steps are as follows:

step a: minimizing $[o(X-X_0)+\varepsilon]^T[o(X-X_0)+\varepsilon]$ by using least squares method to obtain an approximate solution $X_1$ of $X$, and then:

$$X_1 = X_0 + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_0)]$$

step b: in the case of, most commonly, $|X^*-X_1| \le |X^*-X_0|$, obtaining the solution sequence $X_p$ by using least squares method continuously:

$$X_{p+1} = X_p + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_p)],$$

and
- step c: if $|X^*-X_{p+1}| \leq |X^*-X_p|$, returning to the step b, otherwise, ending loop and thus obtaining $X_p$ fast approaching the genuine solution value $X^*$; and
- step 9: adding the integer portion and a solution of the decimal portion to obtain a whole phase value, and the high-resolution phase detection based on the plane grating laser interferometer is completed.

Hereinafter, the high-resolution phase detection method based on the plane grating laser interferometer of the present disclosure will be described in conjunction with the accompanying drawings and examples. The method comprises the following steps:

- step 1: in the dual-frequency plane grating laser interferometer, as shown in FIG. 1, the laser source 1 emitting a laser beam passing through the collimator, the laser beam being divided into two beams by the beam splitter after passing through the quarter wave plate; one beam outputting the first output signal after passing through the first interferometer, and the other beam continuing to be divided into two beams by the polarizing beam splitter, and the two beams divided by the polarizing beam splitter interfering after being reflected by the gratings mounted on the fixed platform and the movable platform respectively to output the second output signal after passing through the second interferometer, wherein the first interferometer outputs a standard sine signal as a reference signal, and the second interferometer outputs a sine-like signal as a measurement signal;
- step 2: a digitizing processing flow of the high-resolution phase detection method based on the plane grating laser interferometer, as shown in FIG. 2, wherein each of the phase changes of the sine-like signal and the standard sine signal includes an integer portion and a decimal portion, as shown in FIG. 3;
- step 3: calibrating a phase of the integer portion of the phase changes, wherein the integer portion of a phase change is represented by N·2π, and wherein N is the number of integer period of the phase change;
- step 4: solving the decimal portion of each phase change: establishing a measured signal function as y(t)=A sin (ωt)+ε, wherein the displacement measurement signal and the reference signal are measured signals, t is the sampling time, y(t) is the sampling value of the measured signal at time t, A is the amplitude of the signal, ω is the angular frequency of the signal, and ε is the noise of the signal;
- step 5: sampling the measured signal at a predetermined sampling time interval before time $t_c$, and recording m+1 sampling points; considering the computing resources and the computing power of the field programmable gate array (FPGA), it may be selected that m=32; and obtaining the displacement measurement signal, which is $y(t_{c,-n})=A \sin(\omega t_{c,-n})+\varepsilon_{c,-n}$, of 32 sampling points before time $t_c$ by using the function in step 4, wherein the sampling time is represented by $t_{c,0}$, $t_{c,-1}$, ..., $t_{c,-(n-1)}$, $t_{c,-(n-2)}$, ..., $t_{c,-(m-1)}$, $t_{c,-32}$, n=0, 1, 2, ..., 32, and $\varepsilon_{c,-n}$ is the noise of the signal at time $t_{c,-n}$;
- step 6: converting $y(t_{c,-n})=A \sin(\omega t_{c,-n})+\varepsilon_{c,-n}$, in step 5 to $y(t_{c,-n})=A \sin(\omega t_c - n\omega T_g)+\varepsilon_{c,-n}$, wherein the predetermined sampling time interval is represented by $T_g = t_{c,0}-t_{c,-1} = \ldots = t_{c,-(n-1)}-t_{c,-(n-2)} = \ldots = t_{c,-31}-t_{c,-32}$, let the phase at time $t_c$ be $\varphi_c = \omega t_c$, and let $\varphi_g = \omega T_g$, and then:

$$y(t_{c,-n}) = A \sin(\varphi_c - n\varphi_g) + \varepsilon_{c,-n},$$

wherein $\varphi_g$ is the phase change during the predetermined sampling time interval $T_g$, and is referred to as an interval phase, and the ranges of the parameters are $\varphi_c \in [0, 2\pi]$, $$\varphi_g \in \left[\frac{2\pi}{40}, \frac{2\pi}{3}\right];$$

- step 7: repeating step 6 to establish 33 measured signal equations, and obtaining the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-32}) = A\sin(\varphi_c - m\varphi_g) + \varepsilon_{c,-m} \end{cases}.$$

- step 8: solving the above equation set as a general nonlinear equation set $Y = f(X) + \varepsilon$, wherein Y is the sampling value $y(t_{c,-n})$ of the measured signal, and $X = [\varphi_c \; \varphi_g \; A]$ is the unknown to be solved; the initial value and the genuine solution value of the general nonlinear equation set are represented by $X_0$ and $X^*$ respectively, wherein $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0}(X-X_0) + o(X-X_0) + \varepsilon,$$

wherein $o(X-X_0)$ is an infinitesimal compared with $(X-X_0)$; and the initial value $X_0$ is close enough to $X^*$, a solution fast approaching the genuine solution value $X^*$ is obtained by using least squares method, and the specific steps are as follows:

- step a: minimizing $[o(X-X_0)+\varepsilon]^T[o(X-X_0)+\varepsilon]$ by using least squares method to obtain an approximate solution $X_1$ of X, and then:

$$X_1 = X_0 + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_0)]$$

- step b: in the case of, most commonly, $|X^*-X_1| \leq |X^*-X_0|$, obtaining the solution sequence $X_p$ by using least squares method continuously:

$$X_{p+1} = X_p + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_p)],$$

and
- step c: if $|X^*-X_{p+1}| \leq |X^*-X_p|$, returning to the step b, otherwise, ending loop and thus obtaining $X_p$ fast approaching the genuine solution value X; and
- step 9: adding the integer portion and a solution of the decimal portion to obtain a whole phase value, and the high-resolution phase detection based on the plane grating laser interferometer is completed.

A planar two-DOF (degree of freedom) displacement measurement method based on the magnetic field information is realized by the above steps, in which the phase detection algorithm needs only 3 iterations before convergence, and the phase detection error reaches 1/8192 (in units of one period).

Figure 6:
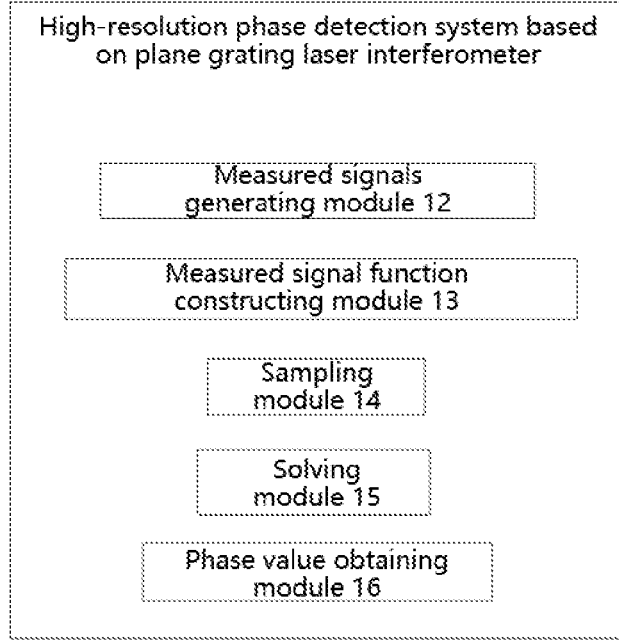
FIG. 6 is a block diagram of the construction of the high-resolution phase detection system based on the plane grating laser interferometer according to the present disclosure.

FIG. 6 is a block diagram of the construction of the high-resolution phase detection system based on the plane grating laser interferometer according to the present disclosure, as shown in FIG. 6, the high-resolution phase detection system comprises:

- a measured signal generating module 12, which outputs a standard sine signal as a reference signal by using a first interferometer, and outputs a sine-like signal as a displacement measurement signal by using a second interferometer in a dual-frequency plane grating laser interferometer, wherein the displacement measurement signal and the reference signal are referred to as measured signals, each of phase changes of the sine-like signal and the standard sine signal includes an integer portion and a decimal portion, and the integer portion of a phase change is represented by $N \cdot 2\pi$, and wherein N is the number of integer period of the phase change;
- a measured signal function constructing module 13, which establishes a measured signal function as $y(t) = A \sin(\omega t) + \varepsilon$, wherein t is the sampling time, $y(t)$ is the sampling value of the measured signal at time t, A is the amplitude of the signal, $\omega$ is the angular frequency of the signal, and $\varepsilon$ is the noise of the signal;
- a sampling module 14, which samples the measured signal during a predetermined period before a measurement time, divides the predetermined period into a plurality of sampling points with a predetermined sampling time interval, and obtains a measured signal equation of each of the sampling points by using the measured signal function;
- a solving module 15, which solves a measured signal equation set of the plurality of sampling points as a general nonlinear equation set; and
- a phase value obtaining module 16, which adds the integer portion and a solution of the decimal portion to obtain a whole phase value, and the high-resolution phase detection based on the plane grating laser interferometer is completed.

Preferably, the sampling module 14 comprises:

- a sampling point obtaining unit, which samples the measured signal at a predetermined sampling time interval before time $t_c$, and records m+1 sampling points, wherein m≥3; and obtains the displacement measurement signal of m sampling points before time $t_c$ is $y(t_{c,-n}) = A \sin(\omega t_{c,-n}) + \varepsilon_{c,-n}$ by using the measured signal function, wherein the sampling time is represented by $t_{c,0}, t_{c,-1}, \ldots, t_{c,-(n-1)}, t_{c,-(n-2)}, \ldots, t_{c,-(m-1)}, t_{c,-m}$, n=0, 1, 2, ..., m, and $\varepsilon_{c,-n}$ is the noise of the signal at time $t_{c,-n}$;
- a phase converting unit, which covers the displacement measurement signal $y(t_{c,-n})$ to $y(t_{c,-n}) = A \sin(\omega t_c - n\omega T_g) + \varepsilon_{c,-n}$, wherein the predetermined sampling time interval is represented by $T_g = t_{c,0} - t_{c,-1} = \ldots = t_{c,-(n-1)} - t_{c,-(n-2)} = \ldots = t_{c,-(m-1)} - t_{c,-m}$, and let the phase at time $t_c$ be $\varphi_c = \omega t_c$, and let $\varphi_g = \omega T_g$, and then:

$$y(t_{c,-n}) = A \sin(\varphi_c - n\varphi_g) + \varepsilon_{c,-n},$$

wherein $\varphi_g$ is the phase change during the predetermined sampling time interval $T_g$, and is referred to as an interval phase, and $\varphi_g$ is in a range of 0-360°; and an equation set obtaining unit, which establishes m+1 measured signal equations and obtains the following phase equation set:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \quad \ldots \\ y(t_{c,-m}) = A\sin(\varphi_c - m\varphi_g) + \varepsilon_{c,-m} \end{cases}$$

Preferably, the solving module 15 comprises:

- a nonlinear equation set constructing unit, which solves the measured signal equation set of the plurality of sampling points as a general nonlinear equation set $Y = f(X) + \varepsilon$, wherein Y is the sampling value $y(t_{c,-n})$ of the measured signal, and $X = [\varphi_c \ \varphi_g \ A]$ is the unknown to be solved; and
- an equation set solving unit, obtaining a solution approaching the genuine solution value $X^*$ by using least squares method, wherein the initial value and the genuine solution value of the general nonlinear equation set are represented by $X_0$ and $X^*$ respectively, wherein $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0}(X - X_0) + o(X - X_0) + \varepsilon,$$

wherein $o(X - X_0)$ is an infinitesimal compared with $(X - X_0)$; and the initial value $X_0$ is close enough to $X^*$, a solution fast approaching the genuine solution value $X^*$ is obtained by using least squares method.

Although the foregoing disclosure shows exemplary embodiments of the present disclosure, it should be noted that a variety of changes and modifications can be made without departing from the scope defined by the claims. The functions, steps and/or actions of the method claims according to the embodiments of the present disclosure described herein do not need to be performed in any particular order. In addition, although the elements of the present disclosure may be described or required in individual form, it is also conceivable to have multiple elements, unless explicitly limited to a single element.

The invention claimed is:

1. A high-resolution phase detection method based on a dual-frequency plane grating laser interferometer comprising a laser source, a beam splitter, a polarizing beam splitter, a fixed platform, a movable platform, a first interferometer, and a second interferometer, the method comprising:
   emitting a laser beam by the laser source;
   splitting, by the beam splitter, the laser beam emitted from the laser source into a first split laser beam and a second split laser beam, the first split laser beam passing through the first interferometer, to generate a first output signal;
   splitting, by the polarizing beam splitter, the second split laser beam into a second-first split laser beam and a second-second split laser beam, the second-first split laser beam and the second-second split laser beam interfering with each other after being respectively reflected by a grating mounted on the fixed platform and a grating mounted on the movable platform, to generate a second output signal, wherein the first output signal is a standard sine signal as a reference signal, and the second output signal is a sine-like signal as a displacement measurement signal, and wherein each of phase changes of the sine-like signal and the standard sine signal includes an integer portion and a decimal portion, and the integer portion of a phase change is represented by N·2π, wherein N is a number of integer period of the phase change;

solving the decimal portion of each phase change: establishing a measured signal function as y(t)=A sin(ωt)+ε, wherein the displacement measurement signal and the reference signal are measured signals, t is a sampling time, y(t) is a sampling value of a measured signal at time t, A is an amplitude of the signal, ω is an angular frequency of the signal, and ε is a noise of the signal;

sampling the measured signals during a predetermined period before a measurement time, wherein the measured signals are measured at a plurality of sample points with regular interval during the predetermined period to obtain a measured signal equation of each of the sampling points by using the measured signal function;

solving a measured signal equation set of the plurality of sampling points as a general nonlinear equation set; and adding the integer portion and the solved decimal portion to obtain a whole phase value of the second output signal.

2. The method of claim 1, wherein the step of sampling comprises:

sampling the measured signals at a predetermined sampling time interval before time $t_c$, and recording m+1 sampling points, wherein m≥3, to obtain a displacement measurement signal, which is $y(t_{c,-n})$=A sin$(\omega t_{c,-n})+\varepsilon_{c,-n}$, of m sampling points before time to by using the measured signal function, wherein the sampling time is represented by $t_{c,0}, t_{c,-1}, \ldots, t_{c,-(n-1)}, t_{c,-(n-2)}, \ldots, t_{c,-(m-1)}, t_{c,-m}$, n=0, 1, 2, ..., m, and $\varepsilon_{c,-n}$ is a noise of the signal at time $t_{c,-n}$;

wherein the displacement measurement signal $y(t_{c,-n})$ is represented by $y(t_{c,-n})$=A sin$(\omega t_c - n\omega T_g)+\varepsilon_{c,-n}$, wherein the predetermined sampling time interval is represented by $T_g = t_{c,0} - t_{c,-1} = \ldots = t_{c,-(n-1)} - t_{c,-(n-2)} = \ldots = t_{c,-(m-1)} - t_{c,-m}$, let a phase at time $t_c$ be $\varphi_c = \omega t_c$, and let $\varphi_g = \omega T_g$, and then:

$y(t_{c,-n})$=A sin$(\varphi_c - n\varphi_g)+\varepsilon_{c,-n}$, wherein $\varphi_g$ is a phase change during the predetermined sampling time interval $T_g$, and is referred to as an interval phase, and $\varphi_g$ is in a range of 0-360°; and wherein the general nonlinear equation set established is represented by:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \ldots \\ y(t_{c,-m}) = A\sin(\varphi_c - m\varphi_g) + \varepsilon_{c,-m} \end{cases}$$

3. The method of claim 1, wherein the step of solving the measured signal equation set of the plurality of sampling points as a general nonlinear equation set, comprises:

solving the measured signal equation set of the plurality of sampling points as a general nonlinear equation set Y=f(X)+ε, wherein Y is a sampling value $y(t_{c,-n})$ of a measured signal, X=[$\varphi_c$ $\varphi_q$ A] is an unknown to be solved; an initial value and a genuine solution value of the general nonlinear equation set are represented by $X_0$ and X* respectively, and X* is close to the initial value $X_0$, which means that X* is within a predetermined range to the initial value $X_0$, and then:

$$Y = F(X) + \varepsilon = F(X_0) + \frac{\partial F}{\partial X}\bigg|_{X=X_0} (X - X_0) + o(X - X_0) + \varepsilon$$

wherein $o(X-X_0)$ is an infinitesimal compared with $(X-X_0)$; and the initial value $X_0$ is close enough to X*, a solution approaching the genuine solution value X* is obtained by using least squares method.

4. The method of claim 3, wherein the step of solving the measured signal equation set of the plurality of sampling points as a general nonlinear equation set further comprises:

minimizing $[o(X-X_0)+\varepsilon]^T [o(X-X_0)+\varepsilon]$ by using least squares method to obtain an approximate solution $X_1$ of X, and then:

$$X_1 = X_0 + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_0)];$$

responsive to |X*−$X_1$|≤|X*−$X_0$|, obtaining a solution sequence $X_p$ by using least squares method continuously:

$$X_{p+1} = X_p + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_p)];$$

and responsive to |X*−$X_{p+1}$|≤|X*−$X_p$|, returning to the previous step, otherwise, ending loop and thus obtaining $X_p$ approaching the genuine solution value X*.

5. A high-resolution phase detection method based on a dual-frequency plane grating laser interferometer comprising a laser source, a beam splitter, a polarizing beam splitter, a fixed platform, a movable platform, a first interferometer, and a second interferometer, the method comprising:

step 1: emitting a laser beam, by the laser source;

step 2: splitting, by the beam splitter, the laser beam emitted from the laser source into a first split laser beam and a second split laser beam, the first split laser beam passing through the first interferometer, to generate a first output signal;

step 3: splitting, by the polarizing beam splitter, the second split laser beam into a second-first split laser beam and a second-second split laser beam, the second-first split laser beam and the second-second split laser beam interfering with each other after being respectively reflected by a grating mounted on the fixed platform and a grating mounted on the movable platform, to generate a second output signal, wherein the first output signal is a standard sine signal as a reference signal, and the second output signal is a sine-like signal as a displacement measurement signal, and wherein each of phase changes of the sine-like signal and the standard sine signal includes an integer portion and a decimal portion, and the integer portion of a phase change is represented by N·2π, wherein N is a number of integer period of the phase change;

step 4: solving the decimal portion of each phase change: establishing a measured signal function as y(t)=A sin (ωt)+ε, wherein the displacement measurement signal and the reference signal are measured signals, t is a sampling time, y(t) is a sampling value of a measured signal at time t, A is an amplitude of the signal, ω is an angular frequency of the signal, and ε is a noise of the signal;

step 5: sampling the measured signals at a predetermined sampling time interval before time $t_c$, and recording m+1 sampling points, wherein m≥3 to obtain a displacement measurement signal, which is $y(t_{c,-n})$=A sin($\omega t_{c,-n}$)+$\varepsilon_{c,-n}$, of m sampling points before time $t_c$ by using the function in step 2, wherein the sampling time is represented by $t_{c,0}$, $t_{c,-1}$, . . . , $t_{c,-(n-1)}$, $t_{c,-(n-2)}$, . . . , $t_{c,-(m-1)}$, $t_{c,-m}$, n=0, 1, 2, . . . , m, and $\varepsilon_{c,-n}$ is a noise of the signal at time $t_{c,-n}$;

wherein the displacement measurement signal $y(t_{c,-n})$ in step 3 is replaced by $y(t_{c,-n})$=A sin($\omega t_c - n\omega T_g$)+$\varepsilon_{c,-n}$, wherein the predetermined sampling time interval is represented by $T_g = t_{c,0} - t_{c,-1} = $ . . . $= t_{c,-(n-1)} - t_{c,-(n-2)} = $ . . . $= t_{c,-(m-1)} - t_{c,-m}$, let a phase at time $t_c$ be $\varphi_c = \omega t_c$, and let $\varphi_g = \omega T_g$, and then:

$$y(t_{c,-n}) = A \sin(\varphi_c - n\varphi_g) + \varepsilon_{c,-n},$$

wherein $\varphi_g$ is a phase change during the predetermined sampling time interval $T_g$, and is referred to as an interval phase, and $\varphi_g$ is in a range of 0-360°, and wherein a general nonlinear equation set established is represented by:

$$\begin{cases} y(t_{c,0}) = A\sin(\varphi_c) + \varepsilon_{c,0} \\ y(t_{c,-1}) = A\sin(\varphi_c - \varphi_g) + \varepsilon_{c,-1} \\ y(t_{c,-2}) = A\sin(\varphi_c - 2\varphi_g) + \varepsilon_{c,-2} \\ \quad \ldots \\ y(t_{c,-m}) = A\sin(\varphi_c - m\varphi_g) + \varepsilon_{c,-m} \end{cases}$$

step 6: solving the above equation set as a general nonlinear equation set Y=f(X)+ε, wherein Y is a sampling value $y(t_{c,-n})$ of a measured signal, X=[$\varphi_c$ $\varphi^g$ A] is an unknown to be solved; an initial value and a genuine solution value of the general nonlinear equation set are represented by $X_0$ and $X^*$ respectively, and $X^*$ is close to the initial value $X_0$, which means that $X^*$ is within a predetermined range to the initial value $X_0$, and then:

$$Y = F(X) + \varepsilon = F(X_0) + \frac{\partial F}{\partial X}\bigg|_{X=X_0}(X - X_0) + o(X - X_0) + \varepsilon$$

wherein $o(X-X_0)$ is an infinitesimal compared with $(X-X_0)$; and the initial value $X_0$ is close enough to $X^*$, a solution approaching the genuine solution value $X^*$ is obtained by using least squares method; and step 7: adding the integer portion and the solved decimal portion to obtain a phase value of the second output signal.

6. The method of claim 5, wherein the step 6 of solving the general nonlinear equation set in the method further comprises following steps:

step 6-1: minimizing $[o(X-X_0)+\varepsilon]^T [o(X-X_0)+\varepsilon]$ by using least squares method to obtain an approximate solution $X_1$ of X, and then:

$$X_1 = X_0 + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_0)];$$

step 6-2: responsive to $|X^*-X_1| \le |X^*-X_0|$, obtaining a solution sequence $X_p$ by using least squares method continuously:

$$X_{p+1} = X_p + \left[\left(\frac{\partial F}{\partial X}\bigg|_{X=X_0}\right)^T \left(\frac{\partial F}{\partial X}\bigg|_{X=X_0}\right)\right]^{-1} \left(\frac{\partial F}{\partial X}\bigg|_{X=X_0}\right)^T [Y - F(X_p)];$$

and step 6-3: if $|X^*-X_{p+1}| \le |X^*-X_p|$, returning to step 6-2, otherwise, ending loop and thus obtaining $X_p$ approaching the genuine solution value $X^*$.

\* \* \* \* \*